(12) United States Patent
Sistach

(10) Patent No.: US 12,377,464 B2
(45) Date of Patent: Aug. 5, 2025

(54) METHOD FOR MANUFACTURING A METAL PART

(71) Applicant: SAFRAN AIRCRAFT ENGINES, Paris (FR)

(72) Inventor: Hugo Sistach, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 520 days.

(21) Appl. No.: 17/630,739

(22) PCT Filed: Jul. 28, 2020

(86) PCT No.: PCT/FR2020/051391
§ 371 (c)(1),
(2) Date: Jan. 27, 2022

(87) PCT Pub. No.: WO2021/023925
PCT Pub. Date: Feb. 11, 2021

(65) Prior Publication Data
US 2022/0258235 A1 Aug. 18, 2022

(30) Foreign Application Priority Data
Aug. 6, 2019 (FR) ..................................... 1909002

(51) Int. Cl.
*B22F 7/06* (2006.01)
*B22F 3/22* (2006.01)
(Continued)

(52) U.S. Cl.
CPC ................ *B22F 7/06* (2013.01); *B22F 3/225* (2013.01); *B22F 5/04* (2013.01); *B22F 10/28* (2021.01); *B33Y 10/00* (2014.12); *B33Y 80/00* (2014.12)

(58) Field of Classification Search
CPC .......... B22F 2998/10; B22F 7/06; B22F 5/04; B22F 3/10; B22F 3/225; B22F 10/00;
(Continued)

(56) References Cited

U.S. PATENT DOCUMENTS

2009/0183850 A1 7/2009 Morrison et al.
2020/0180083 A1* 6/2020 Richard .................. B22F 7/064

FOREIGN PATENT DOCUMENTS

CN 106975753 A 7/2017
FR 2 914 204 A1 10/2008
(Continued)

OTHER PUBLICATIONS

International Search Report as issued in International Patent Application No. PCT/FR2020/051391, dated Sep. 21, 2020.

*Primary Examiner* — Moshe Wilensky
(74) *Attorney, Agent, or Firm* — Pillsbury Winthrop Shaw Pittman LLP

(57) ABSTRACT

A method for manufacturing a metal part includes forming by additive manufacturing a blank of a first portion of the part to be manufactured including a first binder and a first metal powder present in the first binder, forming by injection molding a blank of a second portion of the part to be manufactured including a second binder and a second metal powder in the second binder, debinding the blank of the first portion and the blank of the second portion, and joint sintering of the first debound blank and of the second debound blank to obtain the part, the first and the second blanks being in contact during sintering.

3 Claims, 3 Drawing Sheets

(51) Int. Cl.
*B22F 5/04* (2006.01)
*B22F 10/28* (2021.01)
*B33Y 10/00* (2015.01)
*B33Y 80/00* (2015.01)

(58) Field of Classification Search
CPC .......... B22F 10/10; B22F 10/28; B33Y 10/00; B33Y 80/00
See application file for complete search history.

(56) References Cited

FOREIGN PATENT DOCUMENTS

FR 2 944 721 A1 10/2010
FR 3 066 933 A1 12/2018

\* cited by examiner

[Fig. 1]
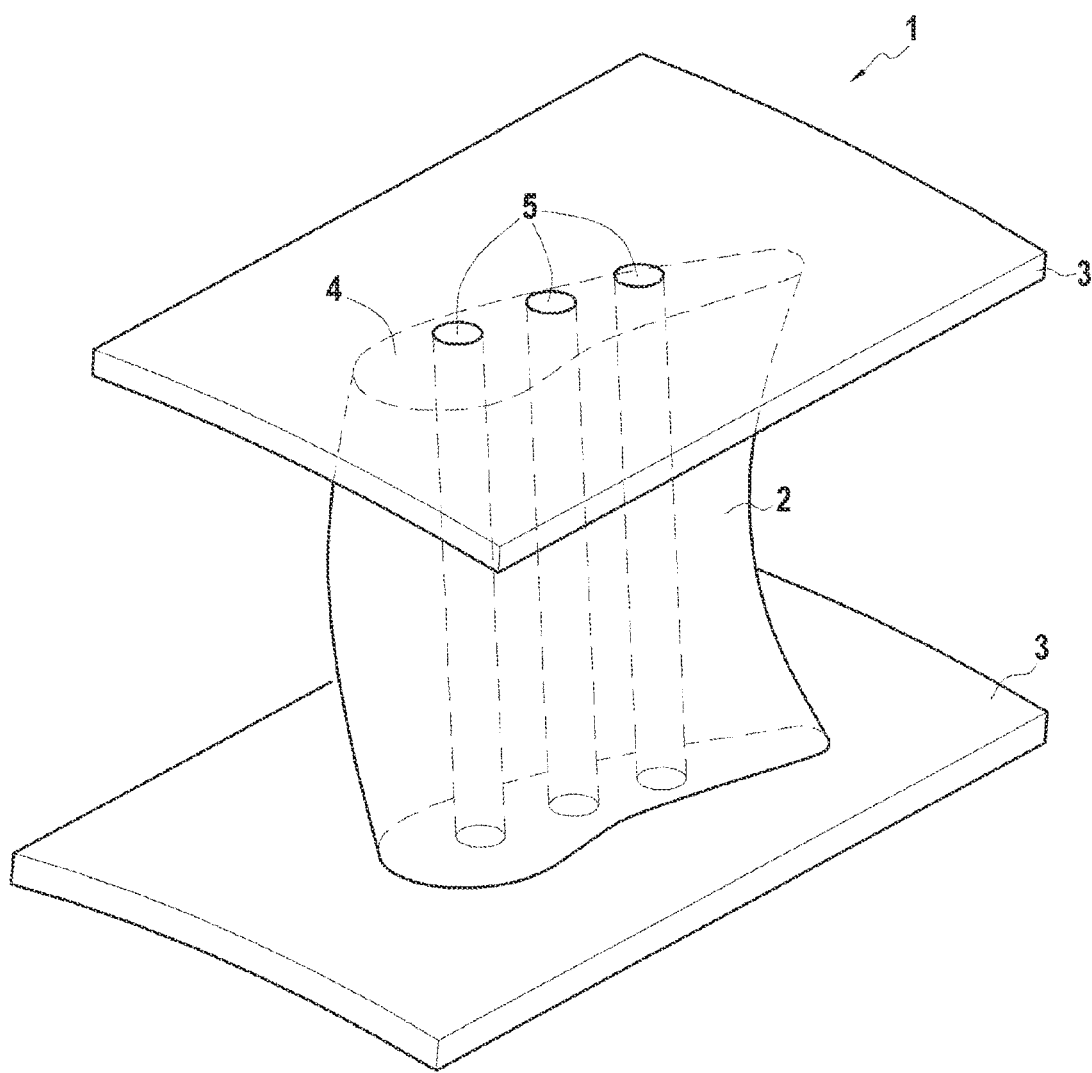

[Fig. 2]
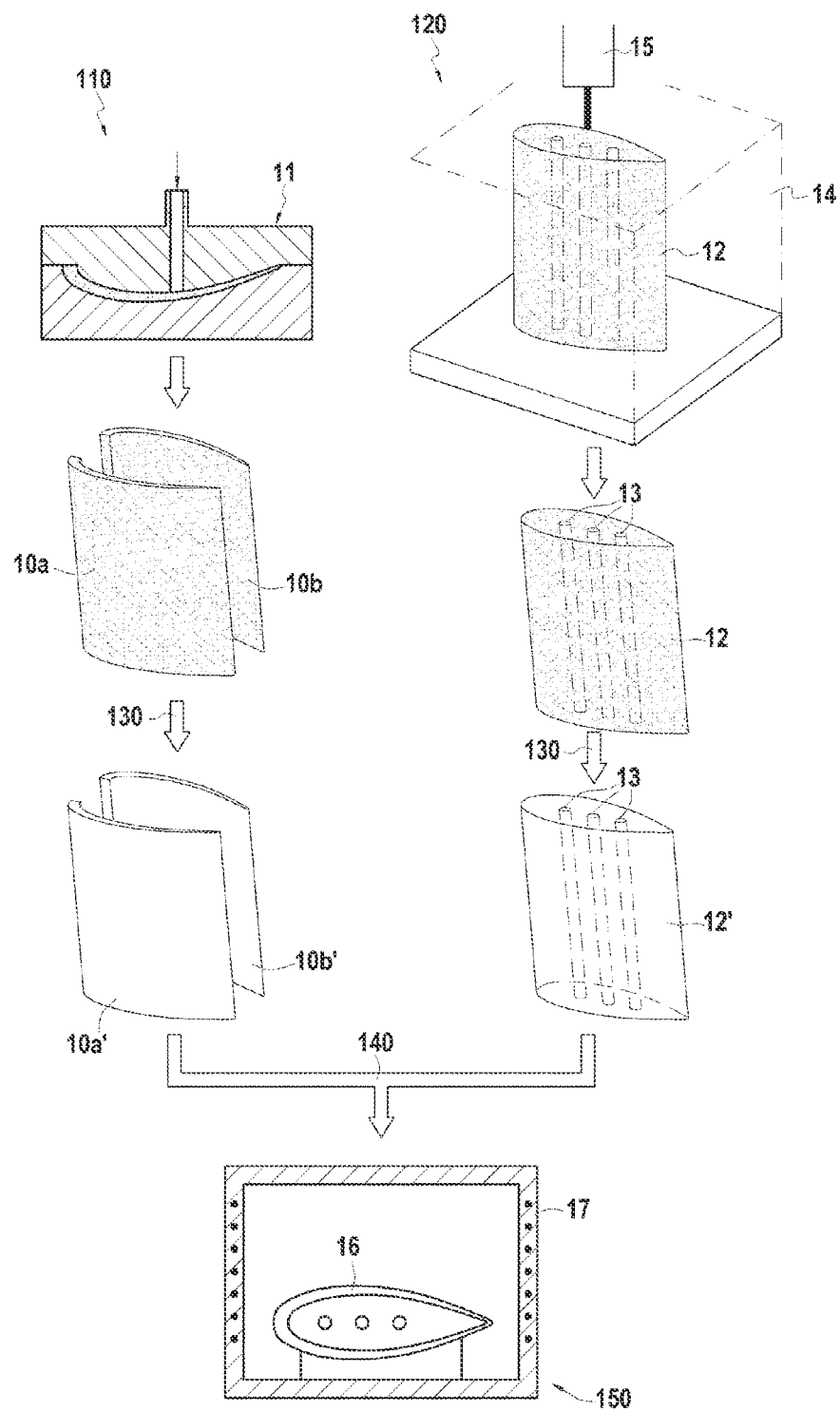

[Fig. 3]
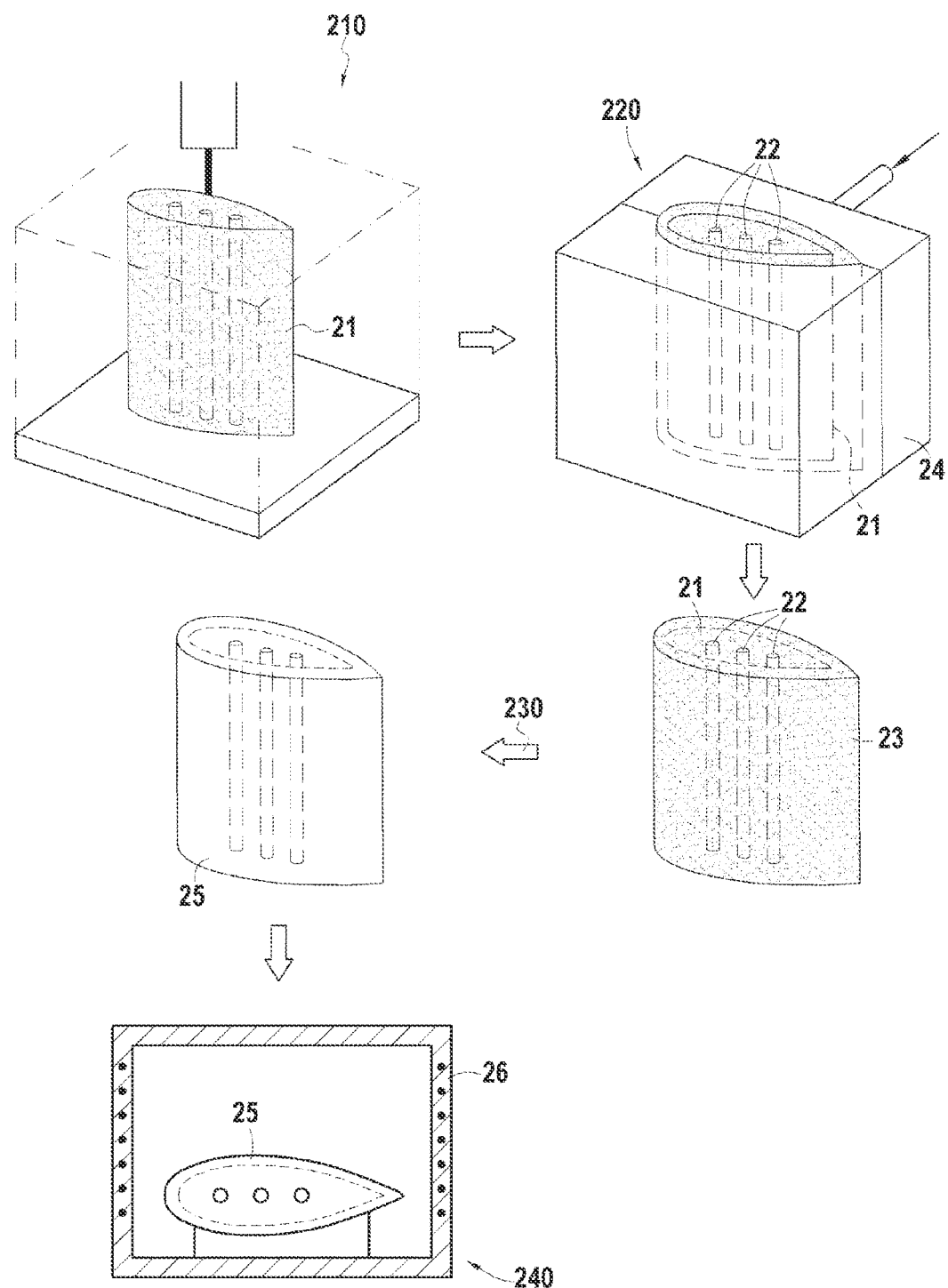

METHOD FOR MANUFACTURING A METAL PART

CROSS-REFERENCE TO RELATED APPLICATIONS

This application is the U.S. National Stage of PCT/FR2020/051391, filed Jul. 28, 2020, which in turn claims priority to French patent application number 1909002 filed Aug. 6, 2019. The content of these applications are incorporated herein by reference in their entireties.

TECHNICAL FIELD

The invention relates to the general field of manufacturing methods for metal parts. It applies in particular to the manufacture of metal parts for aeronautics.

PRIOR ART

To produce parts in large numbers and at reduced cost, the method of injection molding of metal powder (or MIM for "Metal Injection Molding") is known. In this known method, a mixture is formed comprising a metal powder and at least one binder, the mixture is injected in the softened state into a mold having the shape of the part to be manufactured to obtain, after demolding, a blank of the part, the blank is debound and the sintering of the debound blank is carried out to obtain the part.

This method, although it is effective for manufacturing a large number of parts, does not allow the manufacture of parts having complex geometries, such as for example the cooling channels of an aeronautical turbomachine blade. There exists therefore a need for a manufacturing method which allows manufacturing complex parts while being economical and easy to implement.

DISCLOSURE OF THE INVENTION

To this end, the invention proposes a method for manufacturing a metal part comprising at least the following steps:
   forming by additive manufacturing a blank of a first portion of the part to be manufactured, comprising a first binder and a first metal powder present in the first binder,
   forming by injection molding a blank of a second portion of the part to be manufactured, comprising a second binder and a second metal powder present in the second binder,
   debinding the blank of the first portion and the blank of the second portion, and
   joint sintering of the first debound blank and of the second debound blank to obtain the part, the first and the second blank being in contact during sintering.

With a method of this type, it is possible to optimize the manufacture of a part which has a complex portion producible by additive manufacturing, and a simpler portion producible by injection molding. The duration of manufacture is generally longer for additive manufacturing methods that injection molding methods. Thus, the method according to the invention is more rapid and more versatile than conventional methods for manufacturing a metal part. The particular selection of additive manufacturing and injection molding methods based on a powder and a binder then allows effective assembly of the portions of the part obtained by these techniques by means of joint sintering. A robust part is obtained even if the portions have been manufactured by different techniques.

In one exemplary embodiment, the blank of the second portion can be overmolded over the blank of the first portion during injection molding. This arrangement reduces the number of steps of the method.

In one exemplary embodiment, the first and the second blanks can be separately debound and placed in contact once debound prior to their joint sintering.

In one exemplary embodiment, the first blank can be obtained by selective melting on a powder bed. As a variant, the first blank can be obtained by stereolithography, by binder jetting or by fused deposition modelling.

In one exemplary embodiment, the base metal of the first powder and the base metal of the second powder can be identical. What is meant by "base metal" is the metal or metallic alloy which composes the majority, that is at least 50% by mass, of the powder.

In one exemplary embodiment, the ratio between the volume content of powder in the first blank and the volume content of powder in the second blank can be comprised between 0.6 and 1.6; comprised for example between 0.8 and 1.2. It is advantageous that the mass contents in the blanks be close to this ratio to allow a better bond between the two portions during sintering and better continuity of the mechanical properties.

In one exemplary embodiment, the part can be a turbomachine part, for example of an aeronautical turbomachine.

In one exemplary embodiment, the part can be an aeronautical turbomachine blade comprising a first portion corresponding to an internal portion of the blade including at least one cooling channel, and a second portion corresponding to the aerodynamic profile of the blade.

BRIEF DESCRIPTION OF THE DRAWINGS

FIG. 1 shows a very schematic view of an aeronautical turbomachine turbine blade which can be obtained by a method according to the invention.

FIG. 2 shows schematic views illustrating the different steps of a method according to a first embodiment of the invention.

FIG. 3 shows schematic views illustrating the different steps of a method according to a second embodiment of the invention.

DESCRIPTION OF THE EMBODIMENTS

FIG. 1 shows very schematically an aeronautical turbomachine turbine blade 1, for example a fixed blade or a movable blade, which comprises an aerodynamic profile 2 which extends between two platforms 3. The blade 1 illustrated further has an internal portion 4 in which cooling channels 5 are present in which it is possible to circulate air in order to cool the blade 1 during operation.

FIG. 2 illustrates very schematically the different steps of a method according to a first embodiment of the invention. For greater clarity, the manufacture of an assembly comprising the internal portion 4 of the blade, comprising the cooling channels 5, and the aerodynamic profile 2, has been illustrated without the platforms 3. The platforms 3 can be obtained for example in the same manner as the aerodynamic profile 2.

In a first step 110, two blanks 10a and 10b are formed of two halves of the aerodynamic profile 2 by injection molding of a mixture comprising a first metal powder and a first binder. Each blank 10a and 10b corresponds in this example, to a pressure side face and a suction side face of the blade 1 and thus form two shells which, once assembled, can form the aerodynamic profile 2 of the blade 1.

To produce a blank 10a or 10b, the mixture, which has previously been brought to a temperature sufficient for injection, is injected into a mold 11, and the temperature of the mold is regulated to solidify the binder and to be able to demold the blank 10a or 10b in a condition called "green" or plastic.

Typically, the injection can be carried out at pressures which can vary from 400 bars to 800 bars. It is advantageous to perform the injection into a cavity of the mold 11 in which vacuum has been generated, in order to facilitate the injection and ensure the homogeneity of the blank which will be molded.

In a second step 120, which can be carried out before, after or simultaneously with the step 110, a blank 12 is formed by additive manufacturing of the internal portion 4 of the blade 1, which comprises channels 13 intended to form the cooling channels 5 of the blade 1.

In the example illustrated, it is possible to produce the blank 12 by selective melting on a powder bed, and the powder 14 used comprises a mixture of a second metal powder with a second binder in powder form. The device used to accomplish the step 120 implements here a laser 15 which can selectively melt the binder in the successive layers of powder 14 in order to form the blank 12. The parameters of the laser will be suited to the binder that is used. Other additive manufacturing methods can be implemented, stereolithography, binder jetting or fused deposition modelling for example.

The first and second binder can include a compound selected among: the paraffins, thermoplastic resins, agar gel, cellulose, polyethylene, polyethylene glycol, polypropylene, stearic acid, polyoxymethylene, etc. and their mixtures. The first and the second binder can be identical, or as a variant be different. The first and the second binder can have a melting temperature comprised between 80° C. and 120° C. in order to allow better injection into the mold and better melting by the laser. The use of a similar or identical binder for the first and the second binder allows developing a range with a single debinding.

The first or the second powder can comprise a metal or a metallic alloy, for example stainless steel, a titanium and aluminum based alloy, a nickel-based super-alloy, or even copper. The first and the second powder can be identical, in composition and in granulometry; or have different compositions and/or granulometries. In particular, the first powder and the second powder can comprise the same base metal in order to obtain a part with homogeneous properties.

A first volume content of first metal powder in the blanks 10a and 10b which comprise the first metal powder and the first binder can be comprised between 50% and 80%. A second volume content of second metal powder in the blank 12 which comprises the second metal powder and the second binder can be comprised between 50% and 80%. The first and the second volume content can be substantially identical, for example the ratio between the two contents can be comprised between 0.6 and 1.6, or between 0.8 and 1.2, in order to then ensure a better bond during the joint sintering of the debound blanks 10a', 10b', 12'.

In a third step 130, the debinding of the blanks 10a, 10b and 12 is accomplished so as to eliminate the binders present in the blanks. This step allows obtaining debound blanks 10a', 10b' and 12' consisting of a formed metal powder. The debinding can consist of dissolving the binder by treatment with a solvent such as water. It is also possible to carry out debinding by catalytic means in the presence of hydrochloric acid under reduced pressure. Debinding can also be completely carried out or finalized by thermal means. Generally, the type of debinding selected depends on the binder and the powder used.

In a step 140, the debound blanks 10a', 10b' and 12' are placed in contact in order to form a preform 16 of the part to be manufactured. They can be placed in contact and placed directly in an oven 17 in which the preform 16 will then be sintered, or position them in tooling that allows them to be held in contact. It is possible to debind the blanks separately, then place them in contact, or as variant, place them in contact before debinding them.

The step 150 of joint sintering of the debound blanks 10a', 10b' and 12' forming a preform 16 in an oven 17 is finally carried out, in which a sintering temperature is imposed progressively. The blanks are held in contact by means of gravity or tooling. The sintering temperature can be on the order of 80% to 90% of the solidus temperature of the metal or of the alloy present in the powders to be sintered and temperature increase ramps can allow progressively attaining the sintering temperature, in known manner. This step 150 can for example last from 2 hours to 6 hours at a temperature comprised between 1100° C. and 1400° C. for nickel-based super-alloy powders.

FIG. 3 illustrates the different steps of a method according to a second embodiment of the invention.

In a first step 210 identical to the step 110, a blank 21 of the internal portion 4 of the blade 1 is formed by additive manufacturing, comprising cooling channels 22.

In a second step 220, a blank 23 of the aerodynamic profile 2 of the blade 1 is formed by injection molding. More precisely, the blank 23 of the aerodynamic profile 2 is overmolded directly over the blank 21 of the internal portion 4 of the blade 1. To this end, a mold 24 having the shape of the blade 1 to be manufactured is obtained in which is arranged the blank 21 of the internal portion 4, then the mixture comprising a metal powder and a blinder is injected. The mold 24 thus has dimensions greater than those of the blank 21. After this step, an assembly is obtained comprising the blanks 21 and 23 in the green condition which are in contact, and the blank 23 is overmolded by the blank 21.

In a step 230, identical to the step 130, the debinding of the blanks 21 and 23 is accomplished to obtain a preform 25 of the blade 1 in powder, corresponding to the debound blanks 21 and 23.

Finally, the step 240 of joint sintering of the preform 25 in an oven 26 is carried out to obtain the blade 1, identically to the step 150 described previously.

The invention claimed is:

1. A method for manufacturing a metal part comprising:
    forming by additive manufacturing, a blank of a first portion of the metal part to be manufactured, comprising a first binder and a first metal powder present in the first binder,
    forming by injection molding, a blank of a second portion of the metal part to be manufactured, comprising a second binder and a second metal powder present in the second binder wherein the blank of the second portion is overmolded over the blank of the first portion during the injection molding,
    debinding the blank of the first portion and the blank of the second portion, wherein the blank of the first portion and the blank of the second portion are separately debound to produce a first debound blank and a second debound blank, and assembling the first debound blank and the second debound blank after the debinding, joint sintering of the first debound blank and of the second debound blank to obtain the metal part, the first and the second blanks being in contact during sintering, a ratio between a volume content of powder in the first blank and a volume content of powder in the second blank being comprised between 0.6 and 1.6, wherein the metal part is an aeronautical turbomachine blade wherein the first portion comprises an internal portion of the aeronautical turbomachine blade including at least one cooling channel, and wherein the second portion comprises an aerodynamic profile of the aeronautical turbomachine blade.

2. The method according to claim 1, wherein the first blank is obtained by selective melting on a powder bed.

3. The method according to claim 1, wherein a base metal of the first powder and a base metal of the second powder are identical.

\* \* \* \* \*